United States Patent
Sherman et al.

(10) Patent No.: US 7,307,580 B2
(45) Date of Patent: Dec. 11, 2007

(54) NON-STATISTICAL METHOD FOR COMPRESSING AND DECOMPRESSING COMPLEX SAR DATA

(75) Inventors: Jon H. Sherman, Los Angeles, CA (US); John P. Kilkelly, San Pedro, CA (US); Helen L. Sun, Rancho Palos Verdes, CA (US); Ralph E. Hudson, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 108 days.

(21) Appl. No.: 11/333,497

(22) Filed: Jan. 17, 2006

(65) Prior Publication Data

US 2007/0164894 A1    Jul. 19, 2007

(51) Int. Cl.
*G01S 13/90* (2006.01)
(52) U.S. Cl. .................. 342/58; 342/25 D; 342/196
(58) Field of Classification Search ............... 342/25 D
See application file for complete search history.

(56) References Cited

U.S. PATENT DOCUMENTS

| | | | | |
|---|---|---|---|---|
| 4,591,857 A | * | 5/1986 | Thor ........................ | 342/201 |
| 4,780,718 A | * | 10/1988 | Hudson et al. ........... | 342/25 A |
| 4,910,520 A | * | 3/1990 | Rosen et al. .............. | 342/25 A |
| 5,608,404 A | * | 3/1997 | Burns et al. .............. | 342/25 A |
| 6,020,843 A | * | 2/2000 | Krikorian et al. ......... | 342/25 D |
| 6,124,893 A | * | 9/2000 | Stapleton ................... | 348/441 |
| 6,489,997 B1 | * | 12/2002 | Stapleton ................... | 348/441 |
| 2007/0100606 A1 | * | 5/2007 | Rogers ....................... | 704/205 |

\* cited by examiner

*Primary Examiner*—Thomas H. Tarcza
*Assistant Examiner*—Shelley Chen
(74) *Attorney, Agent, or Firm*—Leonard A. Alkov

(57) ABSTRACT

Provided is a non-statistical method for compressing and decompressing complex SAR data derived from reflected energy. The method includes selecting a first FFT to provide a target ratio of pixel spacing to resolution. A second FFT is then selected which is smaller than the first FFT. The data is zero-padded to fill the second FFT and transformed to provide at least one transfer frequency. This transfer frequency is then transferred to the at least one remote site. At the remote site the second FFT is inverted to restore the data from the received transfer frequency. The restored data is then zero-padded again to fill the first FFT. The first FFT is then used to transform the zero-padded restored data to provide a data set of points with the target ratio of pixel spacing to resolution.

16 Claims, 5 Drawing Sheets

NON-STATISTICAL METHOD FOR COMPRESSING AND DECOMPRESSING COMPLEX SAR DATA

FIELD

This invention relates generally to the field of synthetic aperture radar (SAR), and more specifically to the transferring of processed complex data from a location (such as an aircraft or satellite) to the ground over a data link.

BACKGROUND

In general, the larger an antenna, the greater the amount of information the antenna can obtain about a viewed object or area, and the more information the antenna obtains, the finer the resolution and more useful the imaging data becomes. Very large antennas are prohibitively expensive to place in orbit or on aircraft; however, researchers have learned to combine motion of a relatively small antenna with advanced signal processing techniques to simulate the results otherwise obtainable from only a very large antenna.

Synthetic Aperture Radar (SAR) antennas generate rapid radar pulses to image surface areas over which an aircraft or satellite carrying the SAR antenna is passing. The backscatter responses from the radar pulses are received by the SAR antenna and are interpreted with respect to phase and amplitude and recorded over a measured distance. By combining the backscatter responses from many pulses as the SAR passes overhead, a synthetic aperture is formed that is far larger than the aperture of the actual physical SAR antenna.

The SAR data is collected by the radar antenna as radio frequency analog data and converted to digital format through an analog-to-digital converter and provided to an image formation processor. The raw, unprocessed data is commonly referred to as Video Phase History (VPH) data. Each block of VPH data includes two components, an In-phase (I) component and a Quadrature (Q) component. As the VPH data is a waveform, the I is the wave's real component and the Q the imaginary component, with the I and Q combining to provide the wave's overall phase and magnitude.

The output of the image formation processor is detected image data which can be displayed as is, and complex image data which can be used as input to Coherent Change Detection and other complex SAR exploitation tools. This output data is transferred by a data link (e.g., radio frequency communications link) from the aircraft to the ground, where a ground based complex data exploitation processor at the ground station renders detected image or other information on a display.

The ultimate picture provided by SAR is composed of pixels—the smallest units of the picture composition. Not surprisingly, each pixel is therefore represented by the complex image data, and more specifically two data channels that deliver the phase and the magnitude components of the complex image. In addition, for each pixel of the complex image data displayed there is an associated Range and Azimuth corresponding to the physical location or facet scanned.

Advances in SAR technology have enabled the SAR sensors to collect increasingly large amounts of complex image data. The transmission of such data to ground stations typically involves a radio transmission having a limited frequency bandwidth. Moreover, the steady increase in collection efficiency and image size has raised the total data volume to the point where data latency is a problem and a limiting factor in the distribution of near real time information. When the imaged area corresponds to a disaster area, such as a coast line ravaged by a tsunami, or a combat zone, real time transfer and processing is key to the prevention of loss of life and property.

More specifically, at the present time each SAR pixel represented in complex image data is 64 bits, 32 bits each for the I and Q components. In certain SAR configurations, this information is encoded as phase and logarithm of magnitude with two hundred fifty six levels assigned to each. As a typical SAR image may include billions of pixels, the volume of data collected for transmission and processing is enormous. The United States Government has been funding investigations to solve the bandwidth and latency problems by focusing on compressing the transmitted pixels to a target of 5 bits per pixel without incurring image degradation.

Whereas, phase information of the image had been previously discarded, resulting in an immediate reduction in data by a factor of two, the newly recognized importance of phase data necessitates that it too be maintained and transmitted. Previous attempts to compress complex SAR data without degrading the information have not succeeded. Existing compression algorithms, such as JPEG, were specifically designed to take advantage of optical data statistics and high local data correlation.

More specifically, JPEG and other compression algorithms rely on statistical repetition of data, and the ability to represent a statistical group of pixels with a token representative. For example the image of a black ball on a red floor may be highly compressed because of the highly statistical nature of red and black elements within the image. If the red floor accounts for 95% of the image, a compression of well over 75:1 is easily achieved as for each red pixel there is a high local correlation to other red pixels. However, where the image data is perhaps best described as nearly white noise, and statistical elements are rare if even identifiable, the compression method falters as the statistical component is not substantially present.

Magnitude images generated from SAR Magnitude data do compress as the magnitude data generally has correlation. However, Phase data is highly uncorrelated and does not compress well using existing techniques. Several compression methods have been proposed to compress SAR data. While they generally work quite well for the Magnitude data, they do not efficiently compress the Phase data, because the compression methods, designed for visible electro optical imagery, rely on high local data correlation to achieve good compression results. When the data is left in I and Q form, neither component will compress well with JPEG type algorithms.

Complex SAR image data, either in I, Q or phase, magnitude form do not provide high rates of local data correlation. More simply stated, complex SAR data are highly non-statistical, and as such can not be effectively processed by statistical compression methods.

While various compression methods have been explored, each tends to apply unequally to either the magnitude or the phase component, which limits the later accuracy and usage of the compressed data. Remembering that the SAR gathering device is typically in an aircraft or satellite, the compression method employed also should involve minimal computational complexity so as to reduce the processing requirements available at the point of collection.

Hence, there is a need for a complex SAR data compression method to permit improved transfer from the gathering location to the image production location that overcomes one or more of the technical problems found in existing complex SAR data compression methods.

SUMMARY

This invention provides a non-statistical method for compressing and decompressing complex SAR data derived from a reflected energy.

In particular, and by way of example only, according to one embodiment of the present invention, a non-statistical method for compressing and decompressing complex SAR data derived from a reflected energy, including: selecting a first Fast Fourier Transforms (FFT) to provide a target ratio of pixel spacing to resolution; selecting a second FFT smaller than the first FFT; zero-padding the data to fill the second FFT; transforming the zero-padded data with the second FFT to provide at least one transfer frequency; transferring the at least one transfer frequency to a remote location; inverting the second FFT transformation at the remote location to restore the data from the transferred at least one transfer frequency as restored data; zero-padding the restored data to fill the first FFT; and transforming the zero-padded restored data to provide a data set of points with the target ratio of pixel spacing to resolution.

DETAILED DESCRIPTION

Before proceeding with the detailed description, it is to be appreciated that the present teaching is by way of example only, not by limitation. The concepts herein are not limited to use or application with a specific method of compressing and decompressing complex SAR data. Thus, although the instrumentalities described herein are for the convenience of explanation, shown and described with respect to exemplary embodiments, it will be appreciated that the principles herein may be applied equally in other types of methods involving the non-statistical compression and decompression of data.

Figure 1:
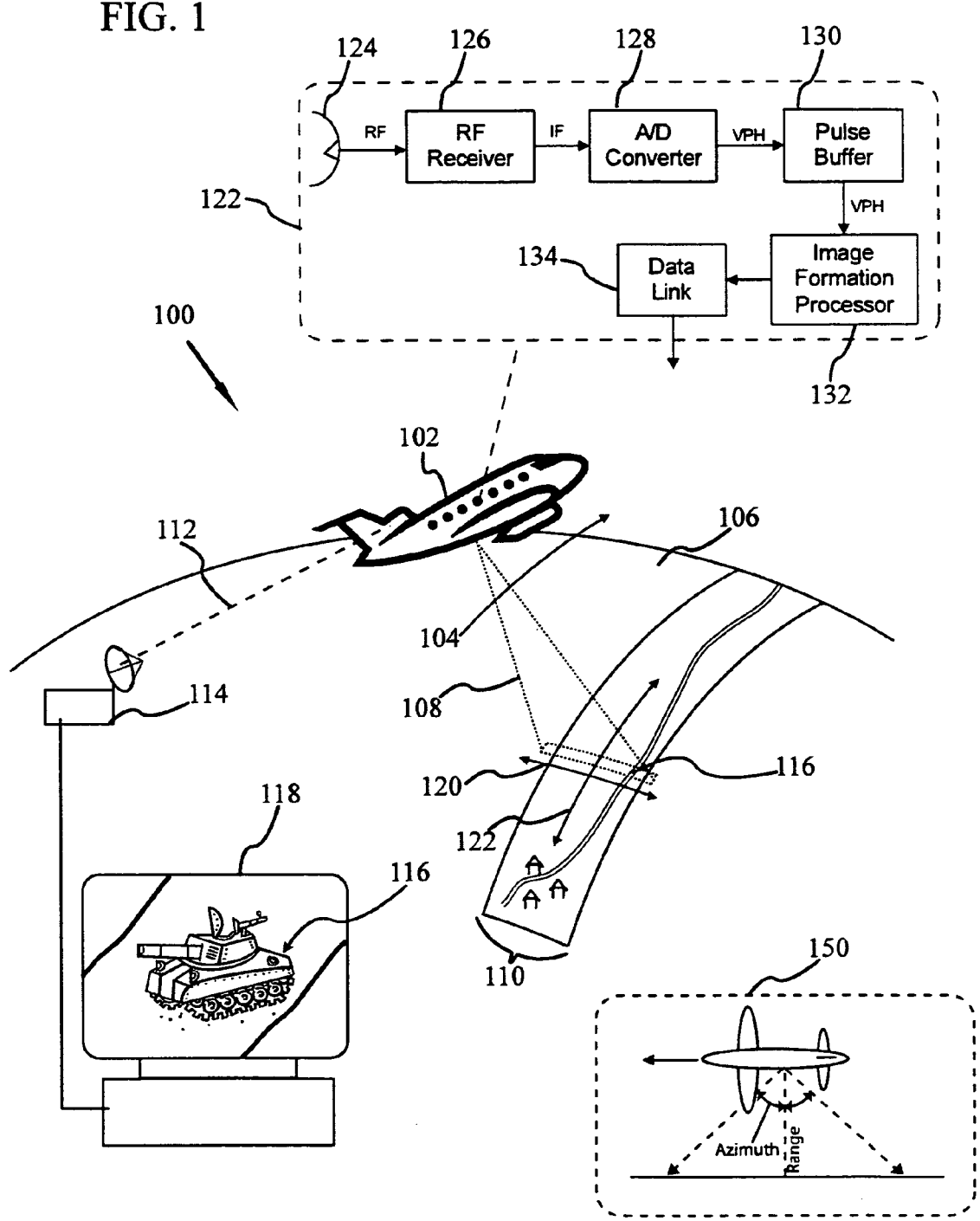
FIG. 1 illustrates a simplified diagram of an SAR system which may or may not incorporate an embodiment of the present invention.
Figure 2:
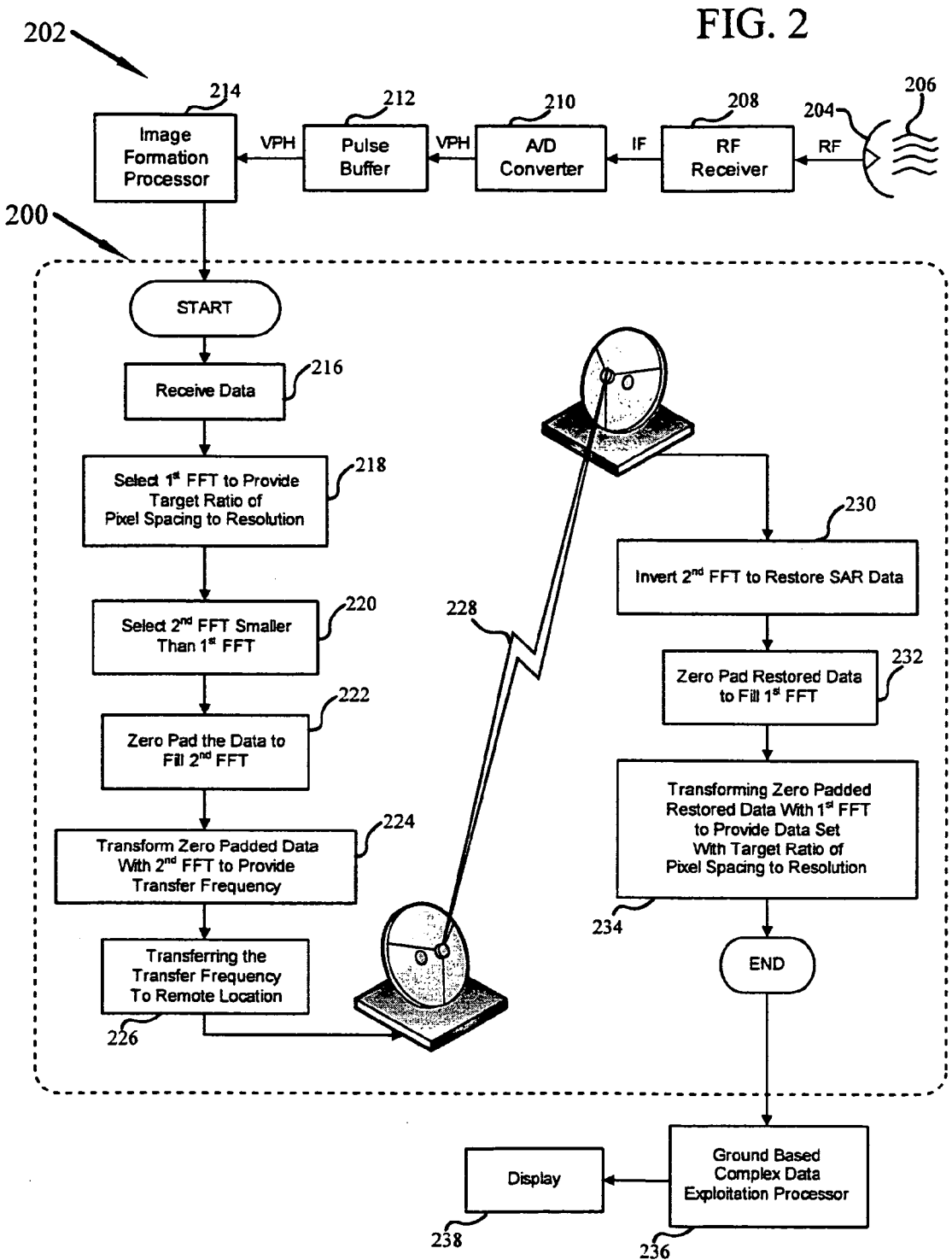
FIG. 2 is a flow diagram of an SAR system incorporating an embodiment of the present invention.

FIGS. 1 and 2 illustrate an exemplary SAR system incorporating a non-statistical system for compressing and decompressing complex SAR data, in accordance with at least one embodiment. More specifically, FIG. 1 provides an overview of the SAR system 100, and FIG. 2 provides an overview of a non-statistical method for compressing and decompressing complex SAR data, hereinafter "SAR compression system" 200, in accordance with at least one embodiment. As SAR compression system 200 is generally incorporated as a preferred component of an SAR system 100, discussion in context of the overall SAR system 100 is believed helpful.

With respect to FIG. 1, an SAR equipped plane 102 is following a known flight path 104 over the ground 106. The SAR antenna radar beam 108 collects images of the ground surface across swath 110 as the plane follows flight path 104. Collected image data is sent to the on board processor where processing of the data is further performed so as to provide complex visual image data 112. The data 112 is then sent from the plane 102 to a ground station 114. The resolution of the SAR system permits a scanned target 116 on the surface to be recognized and enlarged upon a visual display 118. For each element of image data collected from the surface 106, there is an associated range direction 120 and azimuth direction 122 upon the surface 106.

Shown within dotted section 122 is a simplified overview of the airborne SAR data processing operations. SAR data is collected by an antenna 124 as radio frequency "RF" analog data, received by an RF receiver 126, and converted from an intermediate frequency "IF" to digital format through an analog-to-digital converter 128. A pulse buffer 130 may also be employed to insure proper delivery of the signal to the airborne image formation processor 132.

The raw, unprocessed data is commonly referred to as Video Phase History (VPH) data. Each block of VPH data includes two components, an In-phase (I) component and a Quadrature (Q) component. As the VPH data is a waveform, the I is the wave's real component and the Q the imaginary component, with the I and Q combining to provide the wave's overall phase and magnitude. The data output from the image formation processor is a floating point sixty-four bit value for each sample, with thirty-two bits for I and thirty-two bits for Q.

Magnitude (M) and Phase ($\Phi$) components are obtained from the I and Q components by the following equations:

$$M=(I^2+Q^2)^{1/2}$$

$$\Phi=\tan^{-1}(Q/I)$$

Similarly, I and Q components are obtained from the Magnitude and Phase components by the following equations:

$$I=M \cos \Phi$$

$$Q=M \sin \Phi$$

The output of the airborne image formation processor 132 is detected image data which can be displayed as is, and complex image data which can be used as input to Coherent Change Detection and other complex SAR exploitation tools. This output data is transferred by a data link (e.g., radio frequency communications link) from the aircraft to the ground 106, where a ground based complex data exploitation processor at the ground station 114 renders detected image or other information on a display 118.

The ultimate picture provided by SAR is composed of pixels—the smallest units of the picture composition. Not surprisingly, each pixel is therefore represented by the complex image data, and more specifically two data channels that deliver the phase and the magnitude components of the complex image. In addition, for each pixel of the complex image data displayed there is an associated Range and Azimuth corresponding to the physical location or facet scanned.

SAR radar is side looking radar, i.e., the map is always of the ground to the left or right of the ground below the aircraft 102. This is further illustrated in the small inset 150 provided with FIG. 1. Range is the distance from the radar to the centerline of the area to be mapped, and Azimuth is the angle between the SAR antenna and the point on the scanned surface from which the pixel data is being collected (forward or backward from the center line). In other words, locations parallel to the antenna flight path are either increasing or decreasing in Azimuth. Locations running perpendicular to the antenna flight path are either increasing or decreasing in Range.

With respect to the general overview provided in FIG. 1, FIG. 2 now illustrates a conceptual SAR system 202 incorporating a non-statistical SAR compression system 200, in accordance with at least one embodiment. More specifically, an antenna 204 collects reflected energy 206 in the form of radio frequency analog data, which is in turn received by an RF receiver 208 and converted to a digital format through an analog-to-digital converter 210. A pulse buffer 212 may also be provided to insure proper delivery of the digital signal to the airborne image formation processor 214.

The raw, unprocessed data is the VPH data discussed above, consisting of an In-phase (I) component and a Quadrature (Q) component. The data output from the image formation processor is a floating point sixty-four bit value for each sample, with thirty-two bits for I and thirty-two bits for Q.

Stated simply, SAR system 202 extrapolates image data from the constant change in the Phase and Magnitude of the reflected energy beam processed as VPH data, as it tracks from one ground location to another ground location. The change in Phase and Magnitude is a function of the range and azimuth which are of course different for each location.

SAR compression system 200 advantageously permits transfer of the image data output from the image formation processor 214, located in an airborne platform, to one or more ground based sites over a radio frequency data link in less than sixty-four bits per sample, and without loss of desired image data. SAR compression system 200 may be an incorporated component of the image formation processor 214, however it has been illustrated separately in block component form for ease of discussion.

More specifically, the SAR compression system 200 receives data from the image formation processor, as shown in block 216. A target ratio of pixel spacing to resolution the resulting desired image is also known as a pre-determined element. In at least one embodiment, it is desirable to have the pixel spacing set to a distance closer than the resolution, as such close spacing permits enhanced distinction between multiple target elements in the resulting image. In at least one embodiment, this target ratio is 0.56.

Fast Fourier Transforms (FFTs) are well known and frequently utilized algorithms applied to compute Discrete Fourier Transforms (DFTs) and their inverses, as FFTs typically involve a fraction of the mathematical operations required with DFTs. With digital signal processing, FFTs are extremely useful in permitting the representation of I & Q values as frequency. As FFTs generally require the use of data sets in which the number of samples is equal to an integer power of two, the actual data set is zero-padded to fill a selected FFT matrix as is understood in the art.

Zero-padding directly affects the resolution of the FFT output points, which in the case of the SAR system correspond to spacing and frequency of the output points. Simply stated, the more zeros added, and thus the larger the FFT matrix, the smaller the resolution of the output points. Although zero-padding the data for an appropriately sized FFT is required to provide the desired resolution in the resulting SAR images, the use of such an appropriately sized FFT is not required for other processing and computational steps.

As is shown in block 218, a first FFT is selected to provide the desired target ratio of pixel spacing to resolution. A second FFT is then selected, the second FFT being smaller than the first. FFT, as shown in block 220. The data is then zero-padded to fill the second FFT, as shown in block 222.

The data is then transformed as shown in block 224 to provide a transfer frequency. More specifically, the data is encoded through the second FFT to provide a plurality of pixels, each pixel determined from a Range and Azimuth location set corresponding to a physical location. The Range and Azimuth location set correspond to the Phase and Magnitude of the reflected energy corresponding to the actual physical location. Each pixel is represented as a sixty-four bit value, thirty-two bits for the log of the Magnitude and thirty-two bits for the arctangent of the Phase.

Figure 4:
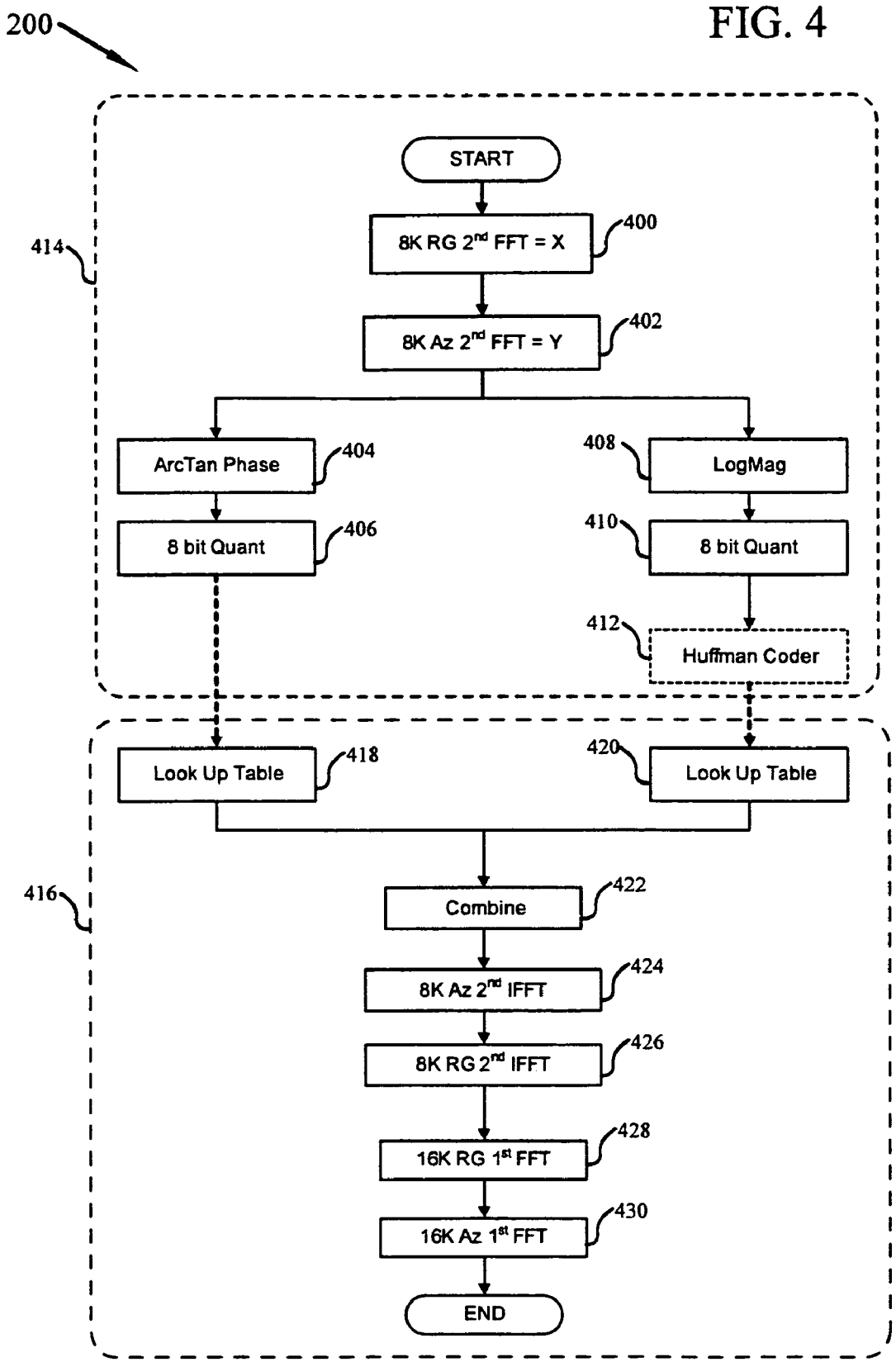
FIG. 4 is a more specific flow diagram of the non-statistical method for compressing and decompressing complex SAR data in at least one embodiment.

A further transformation is performed to convert each floating point thirty-two bit value (LogMag and ArcTan Phase) to a fixed 8 bit value (described in greater detail below and shown in FIG. 4). The combined fixed sixteen bit value (consisting of the fixed eight bit LogMag and fixed eight bit ArcTan Phase), is then transferred as a digital transfer frequency from the airborne location to one or more ground locations, as shown in block 226 and transmission arc 228.

Upon receipt at a ground station, the second FFT is inverted so as to restore the SAR data, as shown in block 230. The restored data is then zero-padded so as to fill the first FFT, as shown in block 232. With the first FFT now filled, the zero-padded data is transformed so as to provide a data set of points with the desired target ratio of pixel spacing to resolution, as shown in block 234. The process performed in block 234 may be integrated with a ground based complex data exploitation processor 236, however it has been shown as a separate element for ease of discussion. The output from such a ground based complex data exploitation processor 236 is provided to a display 238 so as to render the desired SAR image.

Figure 3:
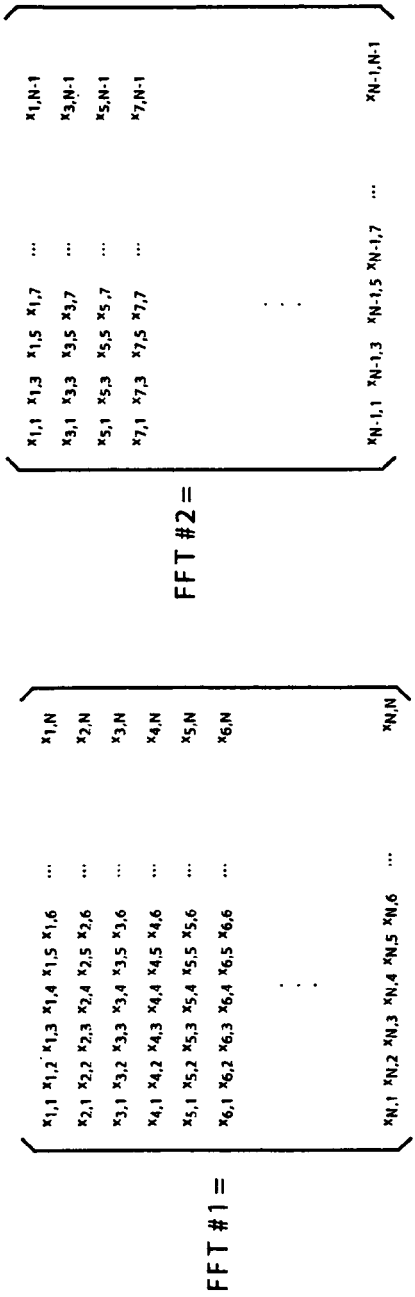
FIG. 3 is a schematic illustration of different FFTs and the resulting wave forms.
Figure 3:
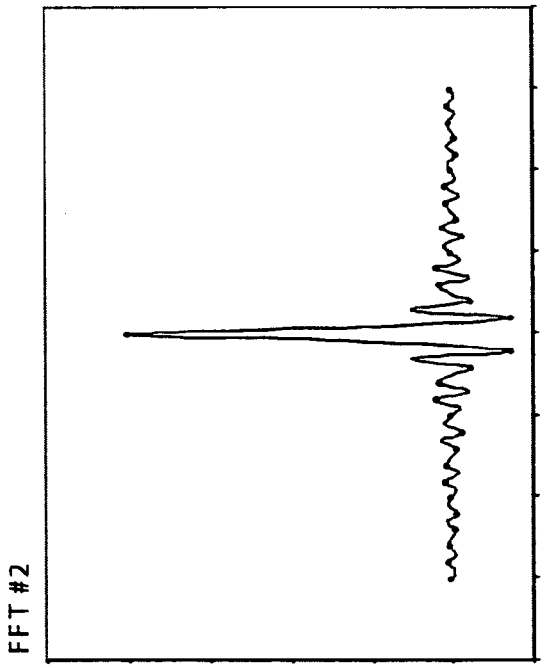
Figure 3:
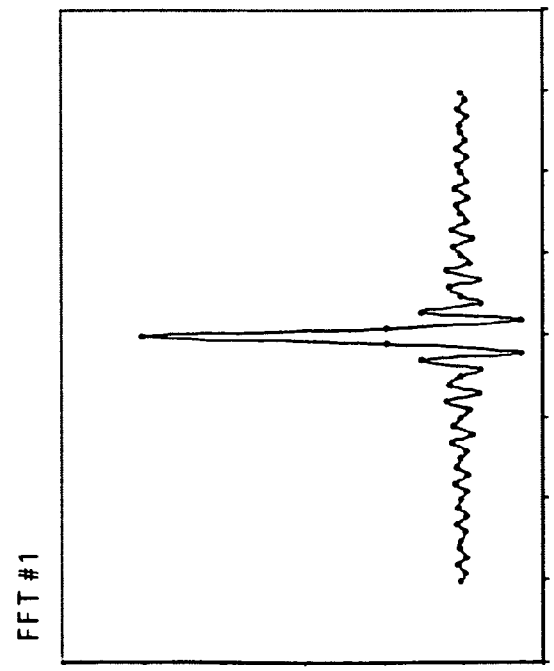

As stated above, the SAR compression system 200 incorporates the use of two different sized FFTs. As there is a difference in the zero-padding necessary to fill the different FFT's the resulting output from each is related. FIG. 3 conceptually illustrates a first FFT (FFT#1) and second FFT (FFT#2) each of which has been provided with the same data set (A, B, C, D), and the resulting frequency output. The output from second FFT is insufficient to provide image resolution as desired. However, as the FFT transformation processes may be inverted to substantially restore the initial data (A, B, C, D), the essential data is not lost.

The advantageous ability to use the smaller second FFT is due to the target ratio of pixel spacing to resolution. The final pixel spacing determines the amount of zero fill used in the FFTs. The high ratio of zero fill used for the final desired pixel spacing implies that the sinc function produced by the FFT from each sinusoidal input component is effectively sampled at significantly higher than the Nyquist ratio. Doing the smaller FFT with less zero fill produces from the same sinusoidal input a sinc function with fewer samples per cycle but still enough to define the sinc function unambiguously, as shown by example in FIG. 3. This makes it possible to perform inverse FFTs and reconstruct the original sinusoid with no loss of information.

In at least one embodiment, wherein the desired target ratio is 0.56, the first FFT is a 16K FFT, and the second FFT is 8K FFT, or half the size of first FFT. FIG. 4 provides a more detailed overview of SAR compression system 200 incorporating these first and second FFTs in at least one embodiment. The data is provided in a two dimensional table corresponding to Range and Azimuth of a location on the ground. It is appreciated that the described method need not be performed in the order in which it is described, but that this description is merely exemplary of at least one method of using SAR compression system 200.

A transformation is performed to determine the Range (RG) as a location X, shown in block 400 and to determine the Azimuth (Az) as a location Y, shown in block 402. Phase data is processed by computing: $\Phi=\tan^{-1}(Y/X)$, as shown in block 404. The resulting thirty-two bit floating point value is then converted to an eight-bit fixed value as shown in block 406.

The Log of the Magnitude is also determined by computing: $\log(X^2+Y^2)^{1/2}$, as shown in block 408. This resulting thirty-two bit floating point value is also converted to an eight-bit fixed value as shown in block 410. The initial thirty-two bit floating point value and the converted eight-bit value for the LogMag are highly statistical and as such, traditional encoding methodologies based on statistics are applicable. In at least one embodiment an optional Huffman Coder is included in the system as indicated in dotted block 412. The Huffman coding process is an entirely lossless process which may be performed to reduce the fixed eight-bit value to a five or six -bit value depending on the statistics of the Log magnitude data.

The computations of LogMag and ArcTan of Phase may be performed sequentially, or as substantially contemporaneous operations. Upon encoding transformation to the two eight bit values, the values are transferred, i.e., transmitted, as digital information from the airborne SAR gathering station to one or more ground locations, indicated by dotted arrows. Moreover, the actions performed within dotted boundary 414 are airborne activities, the remaining actions within dotted boundary 416 are ground based activities.

Upon receipt at the ground reception location, a lookup table is utilized to translate the fixed eight-bit values back to floating point thirty two-bit values, as shown in blocks 418, 420. These floating point values are then combined, as shown in block 422.

The second FFT is then inverted (IFFT) so as to restore the initial Range and Azimuth data as shown in blocks 424, 426. Following the recovery of the Azimuth and Range data, the recovered data is once again transformed, this time by the first FFT so as to provide data points for Range and Azimuth having the desired target ratio of pixel spacing to resolution, as shown in blocks 428, 430.

Moreover SAR compression system 200 is substantially lossless in terms of SAR image data, yet it advantageously compresses the data with a non-statistical method so as to utilize less radio frequency bandwidth for the transfer of the digital information from the airborne collection site to the one or more ground sites. As such the data may be transferred much more quickly so as to permit ground based image formation that is near real time with the airborne data collection.

Figure 5:
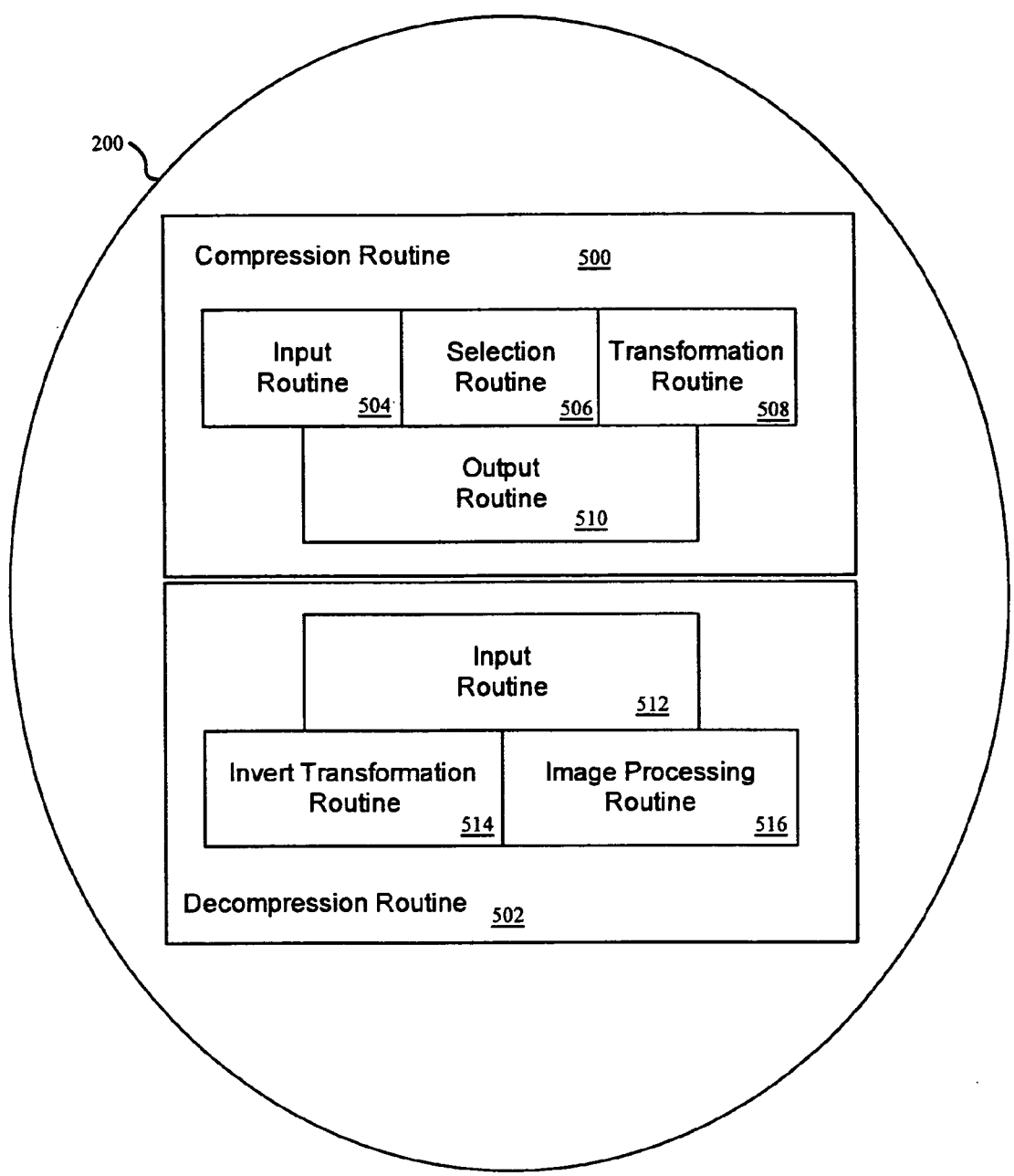
FIG. 5 is a conceptual block diagram of a non-statistical method for compressing and decompressing complex SAR data in accordance with an embodiment.

Having described embodiments of the method, FIG. 5 conceptually illustrates a block diagram of the computer program architecture of SAR compression system 200 in accordance with at least one embodiment. SAR compression system 200 may be implemented on a computer having typical computer components such as a processor, memory, storage devices and input and output devices.

During operation, SAR compression system 200 may be maintained in active memory for enhanced speed and efficiency. As suggested above in the discussion of airborne processes and ground processes, SAR compression system 200 is generally operated on two or more physically separate computer systems. In addition each computer system may be part of a computer network and thus may utilize distributed resources.

SAR compression system 200 has two basic components, a compression routine 500 and a decompression routine 502. Generally, the compression routine 500 is to be considered the airborne routine and the decompression routine 502 is to be considered the ground based routine. It is of course understood and appreciated that the compression routine may be implemented onboard a satellite in space, thus being space borne. It is further understood and appreciated that the compression routine 500 may be implemented by a ground based processing system that is acting to distribute the compressed information to other ground based locations.

As shown, in at least one embodiment, the compression routine 500 has an input routine 504, a selection routine 506, a transformation routine 508 and an output routine 510. The decompression routine 502 has an input routine 512, an invert transform routine 514 and an image processing routine 516. It is understood and appreciated that these routines may be further subdivided and or combined in particular applications and different embodiments.

With respect to the compression routine, the input routine is operatively associated with at least one input device for receiving the complex SAR data as described above with respect to FIG. 2. In at least one embodiment this SAR data is provided in the form of Video Phase History (VPH) data. Such VPH data may be provided directly by the image formation processor component 214 as shown in FIG. 2. In addition, a system user also provides the target ratio of pixel spacing to resolution. Additional information such as time, date and location may also be provided so as to later identify the resulting SAR image data.

To achieve the provided target resolution, the selection routine 506 selects a first FFT and then a second FFT smaller than the first FFT. In at least one embodiment, the second FFT is half the size of the first FFT. The transformation routine 508 is operable to zero-pad the VPH data to fill the second FFT, and perform the transformation as described above to provide at least one transfer frequency. The output routine 510 is operatively coupled with an output device to provide at least the transfer frequency. Moreover, typically the output routine 510 is coupled to a transponder for a radio frequency data link.

With respect to the decompression routine 502, the input routine 512 is operatively associated with at least one input device for receiving the at least one transfer frequency transmitted by the compression routine. Moreover, typically the input routine 512 is coupled to a transceiver for a radio frequency data link. The decompression routine 502 further includes an invert transformation routine for restoring the VPH data from the transferred transfer frequency. More specifically the invert transformation routine 514 inverts the second FFT transformation of the data. An image processing routine 516 transforms the restored data with the first FFT to provide a data set of points with the desired target ratio of pixel spacing to resolution.

As performed in a computer environment, the SAR compression system 200 may be rendered in a variety of different forms of code and instruction as may be preferred for different computer systems and environments. The computer system may be a commercially available system, such as a desktop workstation unit provided by IBM, Dell Computers, Gateway, Apple, Sun Micro Systems, or other computer system providers, or a proprietary system.

In addition, the computer system may also be a networked computer system, wherein memory storage components such as hard drives and additional CPUs and output devices are provided by physically separate computer systems tied together within the network. Indeed the airborne and ground based computer systems implementing SAR compression system 200 may be part of the same computer network.

Those skilled in the art will select an appropriate computer readable medium upon which SAR compression system 200 is provided for use in a desired computer system. Moreover, SAR compression system 200 may be provided by CD Rom, EPROM, magnetic tape, flash memory, or other computer readable medium compatible with the computer system enabled to perform SAR data collection and processing.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A non-statistical method for compressing and decompressing complex SAR data derived from a reflected energy, comprising:
    selecting a first FFT to provide a target ratio of pixel spacing to resolution;
    selecting a second FFT smaller than the first FFT;
    zero-padding the data to fill the second FFT;
    transforming the zero-padded data with the second FFT to provide at least one transfer frequency;
    transferring the at least one transfer frequency to a remote location;
    inverting the second FFT transformation at the remote location to restore the data from the transferred at least one transfer frequency as restored data;
    zero-padding the restored data to fill the first FFT; and
    transforming the zero-padded restored data to provide a data set of points with the target ratio of pixel spacing to resolution.

2. The method of claim 1, wherein the target ratio is between approximately 0.3 and 0.7

3. The method of claim 2, wherein the target ratio is approximately 0.56.

4. The method of claim 1, wherein the complex SAR data is collected through an oversampling process.

5. The method of claim 1, wherein the second FFT is half the size of the first FFT.

6. The method of claim 1, wherein transforming the zero-padded data with the second FFT is performed to provide a Range location and an Azimuth location.

7. The method of claim 6, wherein for each Range and Azimuth location set there is an associated Phase of the reflected energy, further including determining for each Range and Azimuth location set the arctangent of the Phase as a first floating point value.

8. The method of claim 7, wherein the first floating point value is converted to a first fixed bit value before transferring to the remote site.

9. The method of claim 8, wherein the remote site utilizes a look up table to restore the first floating point value from the first fixed bit value.

10. The method of claim 6, wherein for each Range and Azimuth location set there is an associated Magnitude of the reflected energy, further including determining for each Range and Azimuth location set a logarithm of the Magnitude as a second floating point value.

11. The method of claim 10, wherein the second floating point value is converted to a second fixed bit value before transferring to the remote site.

12. The method of claim 11, wherein a Huffman Coder further reduces the size of the second fixed bit value.

13. The method of claim 11, wherein the remote site utilizes a look up table to restore the second floating point value from the second fixed bit value.

14. The method of claim 1, wherein the method is stored on a computer-readable medium as a computer program, which when executed by a computer will perform the steps of non-statistically compressing and decompression complex SAR data.

15. A non-statistical system for compressing and decompressing complex SAR data derived from a reflected energy, comprising:
    receiving means for receiving complex SAR data collected through an oversampling process;
    selecting means for selecting a first FFT to provide a target ration of pixel spacing to resolution and a second FFT smaller the size of the first FFT;
    first transforming means for zero-padding the data to fill the second FFT and transform the zero-padded data with the second FFT to provide at least one transfer frequency;
    transfer means for transferring the at least one transfer frequency to a remote location;
    inverting means for inverting the second FFT transformation at the remote location to restore the data from the transferred at least one transfer frequency as restored data; and
    second transforming means for zero-padding the restored data to fill the first FFT and transforming the zero-padded restored data to provide a data set of points with the target ratio of pixel spacing to resolution.

16. A computer-readable medium on which is stored a computer program for a non-statistical method for compressing and decompressing complex SAR data derived from a reflected energy, the computer program comprising instructions which, when executed by a computer, perform the steps of:
    selecting a first FFT to provide a target ratio of pixel spacing to resolution;
    selecting a second FFT smaller than the first FFT;
    zero-padding the data to fill the second FFT;
    transforming the zero-padded data with the second FFT to provide at least one transfer frequency;
    transferring the at least one transfer frequency to a remote location;
    inverting the second FFT transformation at the remote location to restore the data from the transferred at least one transfer frequency as restored data;
    zero-padding the restored data to fill the first FFT; and
    transforming the zero-padded restored data to provide a data set of points with the target ratio of pixel spacing to resolution.

* * * * *